US009946255B2

(12) United States Patent
Matters et al.

(10) Patent No.: US 9,946,255 B2
(45) Date of Patent: Apr. 17, 2018

(54) REMOTE CONTROL FOR A PARKING ASSISTANCE SYSTEM AND A PARKING ASSISTANCE SYSTEM WHICH CAN BE CONTROLLED BY REMOTE CONTROL

(71) Applicant: Bayerische Motoren Werke Aktiengesellschaft, Munich (DE)

(72) Inventors: Patrick Matters, Munich (DE); Marina Trpinac, Munich (DE); Bernd Bader, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 26 days.

(21) Appl. No.: 14/251,012

(22) Filed: Apr. 11, 2014

(65) Prior Publication Data
US 2014/0222252 A1    Aug. 7, 2014

Related U.S. Application Data

(63) Continuation of application No. PCT/EP2012/070090, filed on Oct. 10, 2012.

(30) Foreign Application Priority Data

Oct. 12, 2011 (DE) .................. 10 2011 084 366

(51) Int. Cl.
G05D 1/02 (2006.01)
G05D 1/00 (2006.01)
B62D 15/02 (2006.01)

(52) U.S. Cl.
CPC ......... G05D 1/0016 (2013.01); B62D 15/027 (2013.01); B62D 15/0285 (2013.01); G05D 1/0011 (2013.01); G05D 1/02 (2013.01)

(58) Field of Classification Search
CPC . G05D 1/0016; B62D 15/027; B62D 15/0285
See application file for complete search history.

(56) References Cited

U.S. PATENT DOCUMENTS 5,570,754 A * 11/1996 Stimson ................. 180/234
5,896,554 A *  4/1999 Itoh ..................... 455/2.01
(Continued)

FOREIGN PATENT DOCUMENTS

CN    101132964 A    2/2008
CN    101216561 A    7/2008
(Continued)

OTHER PUBLICATIONS

International Search Report (PCT/ISA/210) with English translation dated Jun. 17, 2013 (Nine (9) pages).
(Continued)

Primary Examiner — Genna M Mott
(74) Attorney, Agent, or Firm — Crowell & Moring LLP

(57) ABSTRACT

A remote control for a parking assistance system for automated parking of a passenger motor vehicle is provided. The parking assistance system has an environment sensor system that supplies sensor information, and an obstacle detection device for detecting the presence of an obstacle based on the sensor information. In addition, the parking assistance system has a bidirectional wireless communication device that transmits obstacle detection information about the presence of an obstacle to the remote control. The remote control also has a bidirectional wireless communication device for communication with the passenger motor vehicle. In addition, the remote control has one or more parking function operating elements for controlling the parking and/or unparking. The bidirectional communication device of the remote control receives the obstacle detection information. In addition,
(Continued)

the remote control has signaling means for signaling the presence of an obstacle to the operator of the remote control.

19 Claims, 6 Drawing Sheets

(56) References Cited

U.S. PATENT DOCUMENTS

| | | | | |
|---|---|---|---|---|
| 5,938,772 | A * | 8/1999 | Welch | G06F 1/181 |
| | | | | 713/320 |
| 6,072,391 | A * | 6/2000 | Suzuki | B60K 35/00 |
| | | | | 340/435 |
| 6,326,887 | B1 * | 12/2001 | Winner et al. | 340/435 |
| 6,603,388 | B1 * | 8/2003 | Perraud et al. | 340/5.61 |
| 7,944,340 | B1 | 5/2011 | Ghabra et al. | |
| 2002/0157889 | A1 * | 10/2002 | Mackle | B62D 15/027 |
| | | | | 180/204 |
| 2007/0024416 | A1 | 2/2007 | Tang et al. | |
| 2007/0198190 | A1 | 8/2007 | Bauer et al. | |
| 2009/0163140 | A1 * | 6/2009 | Packham | H04L 67/02 |
| | | | | 455/41.2 |
| 2009/0284345 | A1 * | 11/2009 | Ghabra | B60R 25/24 |
| | | | | 340/5.61 |
| 2010/0075656 | A1 * | 3/2010 | Howarter | B60R 25/2009 |
| | | | | 455/420 |
| 2011/0240382 | A1 * | 10/2011 | Gettings | B62D 55/075 |
| | | | | 180/9.1 |
| 2012/0164989 | A1 * | 6/2012 | Xiao | G07C 5/008 |
| | | | | 455/414.1 |

FOREIGN PATENT DOCUMENTS

| | | | | |
|---|---|---|---|---|
| DE | 198 17 142 A1 | 10/1999 | | |
| DE | 101 17 651 A1 | 10/2002 | | |
| DE | 103 46 888 A1 | 5/2005 | | |
| DE | 10 2006 026 653 A1 | 6/2007 | | |
| DE | 10 2008 051 982 A1 | 6/2009 | | |
| DE | 10 2008 033 925 A1 | 1/2010 | | |
| DE | 10 2009 039 111 A1 | 3/2011 | | |
| DE | 10 2009 041 587 A1 | 3/2011 | | |
| EP | 2 295 281 A1 | 3/2011 | | |
| GB | 2435455 A * | 8/2007 | | B62D 59/04 |
| JP | 2007-265288 A | 10/2007 | | |
| WO | WO 2005-021344 A1 | 3/2005 | | |
| WO | WO 2006/087002 A1 | 8/2006 | | |
| WO | WO 2006/092370 A1 | 9/2006 | | |

OTHER PUBLICATIONS

German Search Report with English translation dated Jul. 17, 2012 (Nine (9) pages).

Chinese Office Action issued in Chinese counterpart application No. 201280050127.3 dated Aug. 3, 2015 (Sixteen (16) pages).

Chinese Office Action issued in Chinese counterpart application No. 201280050127.3 dated Apr. 19, 2016, with English translation (Twenty (27) pages).

* cited by examiner

REMOTE CONTROL FOR A PARKING ASSISTANCE SYSTEM AND A PARKING ASSISTANCE SYSTEM WHICH CAN BE CONTROLLED BY REMOTE CONTROL

CROSS REFERENCE TO RELATED APPLICATIONS

This application is a continuation of PCT International Application No. PCT/EP2012/070090, filed Oct. 10, 2012, which claims priority under 35 U.S.C. § 119 from German Patent Application No. 10 2011 084 366.3, filed Oct. 12, 2011, the entire disclosures of which are herein expressly incorporated by reference.

BACKGROUND AND SUMMARY OF THE INVENTION

The invention relates to a remote control for a parking assistance system which can be controlled by remote control, for the purpose of automated parking of a passenger motor vehicle, particularly in a parking space which is accessed frontally, and to a corresponding parking assistance system.

Various types of parking assistants are known. Simple parking assistants include a proximity sensor system, for example a radar sensor system or an ultrasound sensor system, for the purpose of detecting obstacles, wherein the distance to the detected obstacle is indicated to the driver in a visual and/or acoustic manner. Self-steering parking assistants take over the task of driving from the driver, wherein the driver continues to actuate the service brake pedal and accelerator pedal. Moreover, more highly automated parking assistance systems are known which additionally control the drive power and the service brake. The parking assistant in this case carries out the driving tasks as long as the driver is actuating a button in the vehicle. The driver assumes control of the parking procedure via the button in the vehicle. In the case of these parking assistants, the driver remains in the work station of the driver. However, parking assistants are known—for example for parking spaces which can be accessed frontally (for example a single-car garage)—wherein the driver has a position outside of the vehicle during the parking procedure. The control of the parking procedure in this case is shifted to the remote control key rather than to a button in the vehicle. Such parking assistants for parking spaces which can be accessed from the front are also called garage assistants.

A radio-control remote vehicle key is known from DE 101 17 651 A1, which has multiple buttons for the purpose of remote control of a parking assistance system. The vehicle can be maneuvered in straight forward progress in a parking space by means of the parking assistance system. The vehicle operator can move the vehicle forward and backward in a straight line remotely, using visual monitoring, by means of two buttons. The forward movement and/or rearward movement continues as long as the corresponding button is pressed. The vehicle key can be equipped with a bidirectional communication means for the purpose of displaying malfunctions. The malfunctions can be displayed optically by all buttons blinking at the same time. The buttons can also have an optical display for the purpose of signaling their activation. In addition, the buttons can be covered by means of a flip cover in order to prevent an undesired activation of these elements.

A parking assistance system for motor vehicles is described in DE 198 17 142 A1, wherein an automatic parking program can be activated from outside of the vehicle by means of a remote control. Upon the actuation of a first operating element on the remote control, a forward movement of the vehicle is executed; upon actuation of a second operating element on the remote control, a reverse movement of the vehicle is executed.

A method for the remote controlled maneuvering of a vehicle by means of a remote control is known from DE 10 2008 051 982 A1. The remote control includes a plurality of operating elements in the form of buttons. An immobilizer system of the vehicle can be activated and/or deactivated, and an engine can be started and/or turned off by means of a first operating element. A service brake of the vehicle can be braked, a parking brake can be released, and a forward gear of an automatic transmission can be selected by means of a second operating element. By means of a third operating element, it is possible to control a speed of the vehicle via the service brake. The function of a fourth operating element corresponds largely to that of the second operating element, but a reverse speed of the automatic transmission can be selected by means of the same. In addition, the remote control can have light diodes for the purpose of displaying each of the functional states.

A garage assistant for the purpose of supporting a parking procedure of a vehicle in a garage or parking space is known from DE 2008 033 925 A1. The assistant has a proximity sensor system for the purpose of automatically detecting spatial conditions, and a remote control for the purpose of activating a parking procedure. The remote control has, in addition to operating elements for the purpose of inputting the distance and of starting the parking procedure, a display which enables the driver to monitor the parking procedure from the outside. The remote control is integrated into the radio control key.

A remote control for the purpose of remotely controlling the parking of a motor vehicle is known from DE 103 46 888 A1, which has a housing and actuating elements, wherein the housing has an operating interface with elements, the spatial arrangement and/or functions of which emulate the steering elements and wheels of the vehicle.

A problem addressed by the invention is that of providing an improved remote control for a parking assistance system which can be controlled by remote control, and particularly for the purpose of parking in a parking space which can be accessed from the front. A further problem addressed by the invention is that of providing a corresponding parking assistance system which can be controlled by remote control.

A first aspect of the invention relates to a remote control for a parking assistance system which can be controlled by remote control, for the automated parking of a passenger motor vehicle in a parking space. This is preferably a parking assistance system for (frontal and/or reverse) parking in a head-in parking space, particularly for the purpose of parking in a head-in parking space which can be accessed frontally (for example a single-car garage). However, it can also be a parking assistance system which alternatively, or additionally, enables (typically reverse) parking into a longitudinal parking space (parallel to the direction of the street) and/or into a diagonal parking space (orthogonal to the direction of the street).

The remote control can be integrated into a radio control key.

The parking assistance system has an environment sensor system which provides sensor information. In addition, an obstacle detection device is included for the purpose of detecting the presence of an obstacle base on the sensor information from the environment sensor system. Therefore, a decision is made in the obstacle detection device, using the sensor information, as to whether an obstacle is present or not. Obstacle detection information on the presence of an obstacle is determined by means of the obstacle detection device. In addition, a bidirectional communication device is included, meaning a communication device with transmitting and receiving functions. The bidirectional communication device transmits obstacle detection information on the presence of an obstacle determined by means of the obstacle detection device to the remote control. In addition, the communication device can receive information which has been transmitted by the remote control.

The parking function of the parking assistance system automatically controls, by way of example, the drive torque, the service brake, the speed selection, and the steering. The remote control preferably serves the purpose of substantially starting and stopping the automatic parking function; the driver is then not able to influence the speed, the steering, and the selection of a speed directly by means of the remote control. This is automatically taken over by the automatic parking function.

The remote control includes a bidirectional communication device for wireless (for example, by radio or infrared) communication with the passenger motor vehicle. In addition, there are one or more parking function operating elements for the purpose of controlling the parking and/or unparking.

The bidirectional communication device is configured to receive the obstacle detection information determined by means of the obstacle detection device. By way of example, binary data is received which indicates whether an obstacle is present in the direction of travel or not. However, details on the distance of the obstacle can also be transmitted.

In addition, the remote control has signaling means (for example visual or acoustic signaling means) for the purpose of signaling the presence of an obstacle to the user of the remote control, according to the obstacle detection information.

The remote control according to embodiments of the invention therefore makes it possible to receive information from the obstacle detection device contained in the vehicle, and to inform the user of the presence of an obstacle based on this information, without the user needing to be in the vehicle.

By way of example, a forwards operating element is included for the purpose of controlling the forward movement of the passenger motor vehicle, and/or a reverse operating element is included for the purpose of controlling the reverse movement of the passenger motor vehicle. These are, by way of example, each a button wherein the automatically controlled forwards and/or reverse movements are carried out by the parking function as long as the respective button is pressed. The parking procedure preferably takes place in a forward direction, and the unparking procedure preferably takes place in reverse. However, a combined forwards and reverse operating element can be used—for example a rocker button (rocker switch), wherein a forwards movement is carried out when one side of the rocker button is actuated, and a reverse movement is carried out when the other side of the rocker button is actuated, as long as the respective side of the rocker button is actuated.

In place of a mechanical button, a touchscreen (meaning a touch-sensitive display screen) can be used to implement the forwards and/or reverse operating element, or the combined forwards and reverse operating element. By way of example, a surface which is an abstract image of the vehicle in top view can be depicted on the touchscreen for this purpose, wherein the surface can be pushed along a line in two directions by a finger movement, like a slider. The forward movement is initiated by the sliding of the surface in one direction; the reverse movement of the surface is initiated by the sliding of the surface in the other direction.

In one preferred embodiment, the signaling means are visual signaling means. In this case, a forwards display element is preferably included, which is functionally assigned to the forwards operating element, for the purpose of visually signaling the presence of an obstacle detected by means of the obstacle detection device in the forward direction. As an alternative or in addition thereto, the remote control has a reverse display element which is functionally assigned to the reverse operating element, for the purpose of visually signaling the presence of an obstacle detected by means of the obstacle detection device, in the reverse direction.

Such a display element can be implemented using one or more light emitting diodes (LEDs). Such a display element can alternatively be implemented using a display screen, particularly a touchscreen.

By way of example, the forwards and/or reverse operating element and the respective display element (and/or the combined forwards and reverse operating element and the forwards display element and/or the reverse display element) functionally assigned thereto are formed by an integrated operating and display element. By way of example, this can be an integrated operating and display element wherein the operating element is backlit by light from the display element. For this purpose, the operating element can be designed as a membrane keypad, by way of example, wherein each button is backlit by an LED.

However, the forwards display element can be arranged next to the forwards operating element and/or the reverse display element can be arranged next to the reverse operating element (and/or the forwards display element and/or the reverse display element is arranged next to the combined forwards and reverse operating element). The display element and the operating element in this case are preferably spaced apart from each other in such a manner that, when the operating element is actuated, the display element is not covered by the finger used for the actuation.

By way of example, in a typical holding position of the remote control, the forwards display element is arranged above, next to the forwards operating element, and/or above next to the combined forwards and reverse operating element, from the perspective of the user, while the reverse display element is arranged below, next to the reverse operating element and/or below next to the combined forwards and reverse operating element, from the perspective of the user in a typical holding position of the remote control. The forwards operating element in this case is arranged above the reverse operating element, from the perspective of the user, when the remote control is held in the typical position, and/or the side of the combined operating element in this case, said side being functionally assigned to the forwards direction, when the remote control is held in the typical position, is assigned [sic: arranged] above the side of the combined operating element which is functionally assigned to the reverse direction.

If the operating element is a button, the same can be implemented using a snap disk (click spring).

By way of example, for the purpose of signaling the presence of an obstacle in the forwards or reverse direction, the corresponding display element can be illuminated in a first color (for example in red or yellow), and for the purpose of signaling the absence in this direction, the display element can be illuminated in a second color.

The parking function operating elements also preferably include an activation operating element for the purpose of activating the parking function. This is actuated prior to the actuation of the forwards or reverse operating element. In addition a display element for the purpose of signaling the status of the parking function can be functionally assigned to the activation operating element. These two elements are preferably designed as an integrated operating and display element.

In addition, for the purpose of requesting the actuation of an operating element, the associated display element can blink, such that the operator is requested to actuate the operating element. For example, the operating element can blink in a configuration with an integrated operating and display element. In addition, an actuating element can blink in order to request the operator to release the operating element. By way of example, an operating element can blink in a first color (e.g. green) in order to request the driver to actuate the operating element, and in a second color (e.g. yellow) in order to request the operator to release the operating element.

A second aspect of the invention particularly relates to the protection of the parking function operating element from unintentional activation. For this purpose, a remote control is preferably designed in such a manner that it has a base element and a parking function operating part which has one or more parking function operating elements. The remote control is designed in such a manner that, when the parking function operating part is in the covered state, the one or multiple parking function operating elements of the parking function operating part are covered and cannot be operated. The parking function operating part can be transitioned out of the covered state and into an open state of the parking function operating part by movement of the parking function operating part with respect to the base element, wherein the parking function operating elements are visible and can be operated when in said open state. For this purpose, the remote control can have a corresponding mechanism which makes it possible for the parking function operating part to be moved out of the base element, particularly slid out or pulled out. As an alternative, the parking function operating part could also be flipped out to make it visible.

The remote control is preferably designed in such a manner that a parking or unparking function can only be activated if the parking function operating part has reached a defined end position for the movement—for example, if it is completely slid out. For the purpose of activating a parking function, however, it is additionally necessary to actuate an operating element, or even a plurality of operating elements in a defined sequence. Such an initialization actuation sequence can also serve as a child-proof device. As an alternative or in addition thereto, a mechanical lock of the mechanism which moves out and/or flips out could be included.

A further aspect of the invention relates to the parking assistance system which communicates with the remote control. The parking assistance system comprises an environment sensor system and an obstacle detection device for the purpose of detecting the presence of an obstacle based on sensor information from the environment sensor system. In addition, a bidirectional, wireless communication device is included for the purpose of transmitting obstacle detection information on the presence of an obstacle, determined by means of the obstacle detection device, to the remote control, and for the purpose of receiving information transmitted by means of the remote control.

The duty of the driver to control a parking or unparking procedure can be ensured in a configuration wherein the assistance system continuously monitors the remote control to see whether the same is positioned in a defined range near the vehicle. If the remote control is located outside of the range, the assistant system automatically halts the vehicle in a parked position, for example by means of the service brake.

For the purpose of monitoring, two different radio modes are included in the communication device of the vehicle: a first radio mode with a lesser range, and a second radio mode with a range which is greater than the range of the first radio mode. The first radio mode is preferably implemented by means of a first radio device which works in the low frequency (LF) range (30-300 kHz), and the second radio mode is preferably implemented by means of a second radio device which works in the ultra-high frequency (UHF) range, by way of example (300 MHz to 3000 MHz).

The first radio device with the lesser range is controlled cyclically, by way of example. The first radio device with the lesser range transmits a signal to the remote control. If the remote control is located within the range of the first radio device, the remote control transmits a confirmation signal to the vehicle confirming that this signal has been received from the vehicle. The confirmation signal is received by means of the second radio device. If the confirmation signal is not received, this means that the remote control is located outside of the range of the first radio device. In this case, the parking function (as the parking or unparking function) is blocked or interrupted, for example.

By using two radio systems, the key functions of a remote control with an integrated key function are not compromised (particularly as regards range), because they can be entirely implemented via the second antenna system which has a high range.

Other objects, advantages and novel features of the present invention will become apparent from the following detailed description of one or more preferred embodiments when considered in conjunction with the accompanying drawings.

DETAILED DESCRIPTION OF EXEMPLARY EMBODIMENTS

Figure 1:
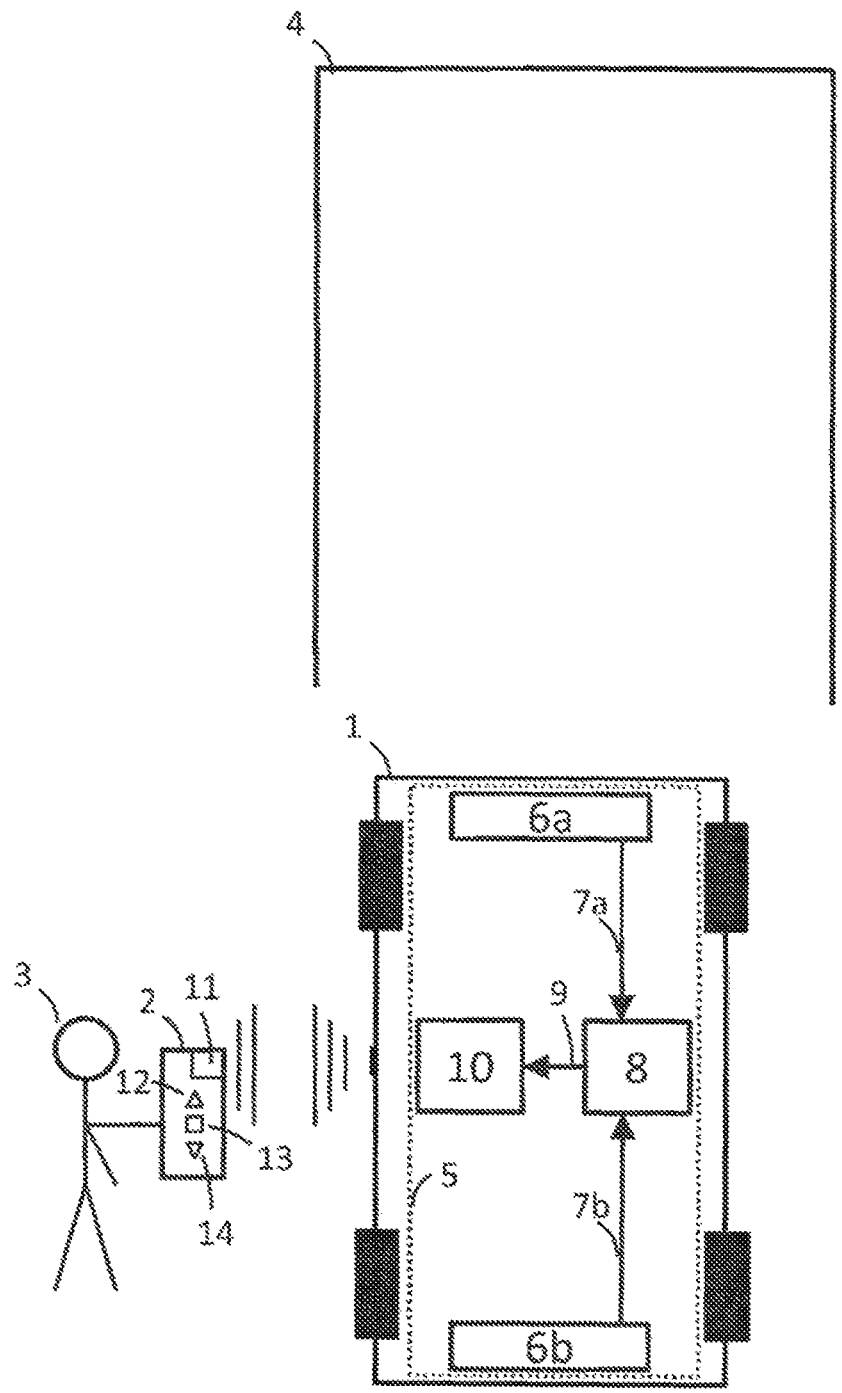
FIG. 1 shows a passenger motor vehicle having one embodiment of the parking assistance system according to the invention, which can be controlled by remote control.

FIG. 1 shows a schematic view of a passenger motor vehicle 1 having one embodiment of the parking assistance system 5 according to the invention, which can be controlled by remote control 2 by an operator 3 of the remote control 2. The parking assistance system 5 provides support, for example, in a difficult parking procedure into a head-in parking space 4, particularly in frontal parking. The head-in parking space 4 is, by way of example, a garage, a narrow parking space, or a public parking space. The parking assistant 5 has two modes, for example: a parking mode, wherein the parking assistant parks the vehicle forwards into the parking space 4, and an unparking mode, wherein the parking assistant 5 unparks the vehicle 1 out of the parking space 4. Both modes preferably have no forced coupling. Accordingly, the driver can park his vehicle 1 himself, by way of example, and then allow the unparking procedure to be carried out by means of the described function. As an alternative, the parking assistant 5 can be something which alternatively, or additionally, enables parking into longitudinal parking spaces or diagonal parking spaces.

Because the operator 3 is not in the vehicle 1 during the parking maneuver, and need not exit the vehicle 1 after the maneuver, the parking space can be narrow with respect to the width of the vehicle (for example a narrow garage). In order to park the vehicle 1 in the parking space 4, the driver 3 exits the vehicle 1 and starts the automatic parking procedure via a remote control 2. The parking assistant 5 then takes over the control of the drive, braking, and steering functions, and optionally the gear selection function, and maneuvers the vehicle independently into the narrow garage—and also out of the same at a later time. As such, the driver is spared the discomfort of entering and exiting the vehicle in narrow garages, and is also potentially spared damaged doors. For simplification, the automatic control functions of the parking assistance system 5, for controlling the drive, braking, etc., as well as the interface to the corresponding control devices of the vehicle 1 are not illustrated in FIG. 1.

The parking assistance system 5 includes two partial environment sensor systems 6a, 6b. These are, by way of example, an ultrasound, radar, or camera-based environment sensor system, or a combination of different types of environment sensor systems. In the example in FIG. 1, a first environment sensor system 6a, for the purpose of detecting the environment in the forward direction, is positioned on the front side, and a second environment sensor system 6b for the purpose of detecting the environment in the rearward direction is positioned on the rear side, each typically having a plurality of individual sensors. The sensor information 7a, 7b of the environment sensor systems 6a, 6b is further processed by an obstacle detection device 8; rather than one detection device 8 for both directions, two completely separate detection devices can be included for the two directions—for the forward and the rearward directions. The presence of an obstacle is determined in the obstacle detection device 8 based on the sensor information 7a, 7b. The information 9 on the presence of an obstacle (or absence thereof)—called the obstacle detection information 9 below—is transmitted by a bidirectional wireless communication device 10 to the remote control 2. In this case, the obstacle detection information 9 can be reformatted into any suitable format for the transmission. In addition, the bidirectional communication device 10 can receive control signals from the remote control 2, by way of example.

The remote control 2 has a bidirectional communication device 11 for the purpose of communication with the communication device 10 of the vehicle 1. In addition, there are parking function operating elements 12-14, for example in the form of buttons, meaning keys. As an alternative, a touchscreen can also be used to implement the parking function operating elements 12-14. The bidirectional communication device 11 is configured to receive the obstacle detection information 9 on the presence of an obstacle determined by means of the obstacle detection device 10. In addition the remote control 2 has signaling means 12-14.

The signaling means 12 and 14 serve the purpose of signaling the presence of an obstacle to the operator of the remote control according to the obstacle detection information 9 received. In the embodiment in FIG. 1, there are, by way of example, integrated operating and display elements 12-14, wherein the keys of each operating element are backlit by light from the display element (for example an LED), for example. In addition, each display element can be positioned next to the operating element.

In the embodiment in FIG. 1, a forwards button 12 for the purpose of controlling the forward movement of the passenger motor vehicle 1, and a reverse button 14 for the purpose of controlling the rearward movement of the passenger motor vehicle, are included in the remote control 2. The forwards button 12 is equipped with a forwards display element (for example an LED) 12 which is able to signal the presence of an obstacle in the forward direction. The reverse button 14 is equipped with a reverse display element (for example an LED) 14 which serves the purpose of visually signaling the presence of an obstacle in the reverse direction.

Figure 2:
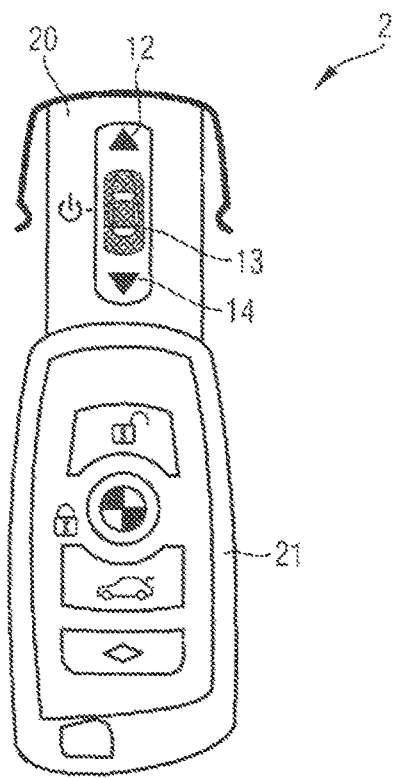
FIGS. 2-9 show an embodiment for the remote control schematically illustrated in FIG. 1, in various different states and views.

FIG. 2 shows one embodiment of the remote control 2 illustrated schematically in FIG. 1. In this case, it is a radio remote control 2 which has a parking function operating part 20 with the parking function operating elements 12-14, and a base element 21. The base element 21 has operating elements for the purpose of opening and closing the vehicle 1. The remote control 2 therefore has dedicated parking function operating elements, such that it is possible to avoid assigning two functions to buttons on the base element in the implementation of the parking function control.

The parking function operating part 20 on the base element 21 is preferably able to be moved out, for example to be slid out or pulled out. The operating surface with the parking function buttons 12-14 can only be seen and operated after the parking function operating part 20 has been moved out. The parking function can preferably only be activated once the operating part 20 has been fully slid out. The forwards button 12, the reverse button 14, and a so-called activation button 13 can each be selectively backlit by means of the light from two-color LEDs, for example selectively with a green light or a yellow light. According to the presence of an obstacle in the forward direction or the reverse direction, the forwards button 12 and/or reverse button 13 is backlit in a first or a second color. In the following, the assumption is made, by way of example, that each button 12 and/or 13 is illuminated in yellow given the presence of an obstacle in the forwards direction and/or reverse direction, and is illuminated in green in the absence of an obstacle. However, any two different colors can be used for the purpose of signaling the presence of an obstacle or absence of the same. The buttons 12-14 can have symbols, for example (by way of example, triangles in different directions, and a vehicle shown in top view as in FIG. 2). The buttons 12-14 can be backlit in such a manner that the light passes through the respective symbol when viewed from above, and does not pass through the surface of the respective button around the symbol.

Figure 3:
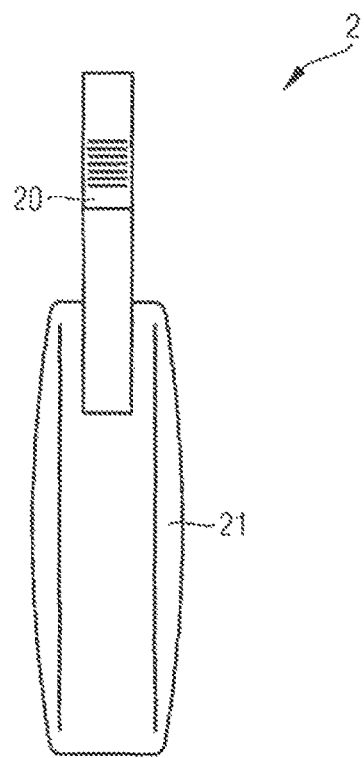

FIG. 3 shows the remote control 2 illustrated in FIG. 2, in a side view.

Figure 4:
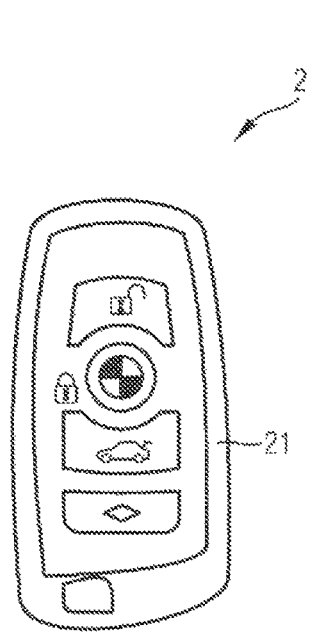
Figure 5:
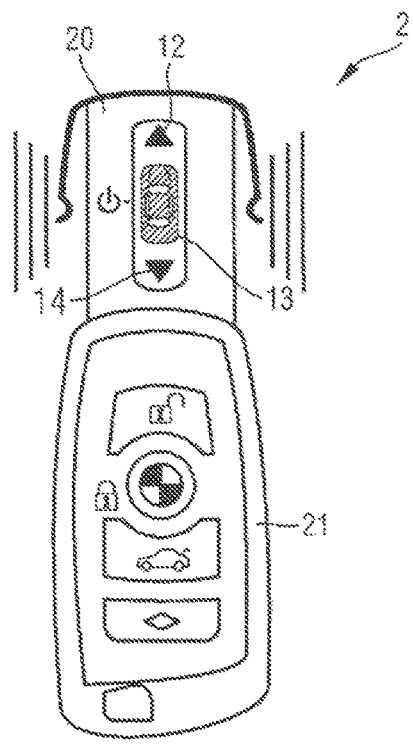

The remote control 2 is shown in FIG. 4 prior to the parking function operating part 20 being moved out of the base element 21. Prior to the movement thereof outward, the parking assistant is preferably not yet activated. After the same is moved out, the parking function is preferably still not immediately activated. To activate the parking assistant, the activation button 13 is actuated, the same basically corresponding to an on/off switch (see FIG. 5).

Figure 6:
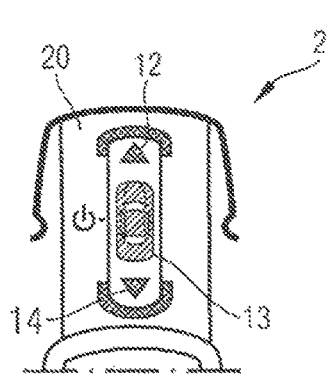

The button 13 preferably blinks after the parking function operating part 20 is moved out in order to request the operator 3 to actuate the button 13. After the button 13 is actuated, the operator 3 is informed, by the color with which the forward button 12 and the reverse button 13 are backlit, whether an obstacle is present in the forwards direction and/or the reverse direction. In the situation illustrated in FIG. 6, the forward button 12 and the reverse button 14 are each illuminated in yellow in order to inform the operator 3 that there is an obstacle in both the forwards direction and the reverse direction. In the situation illustrated in FIG. 7, in contrast, the forward button 12 is illuminated in green, and the reverse button 14 in yellow, in order to inform the operator 3 that there is no obstacle in the forwards direction and there is an obstacle in the reverse direction. The forward button 12 is not persistently illuminated in the case in FIG. 7, but rather blinks. In this way, the operator 3 is requested to actuate the blinking forward button 12.

Figure 7:
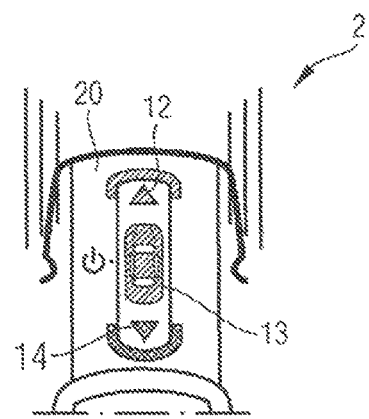
Figure 8:
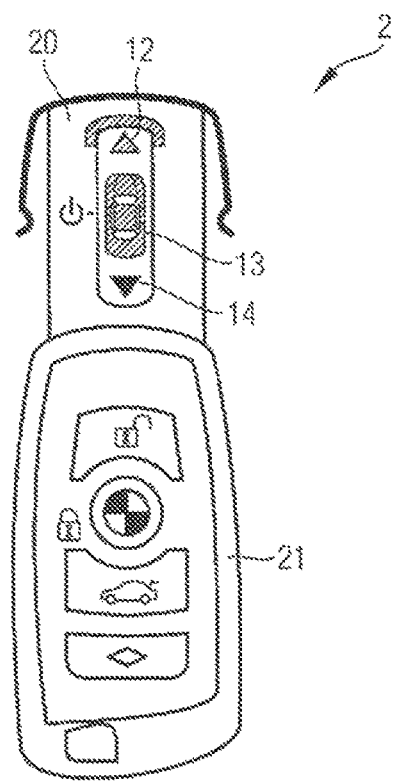
Figure 9:
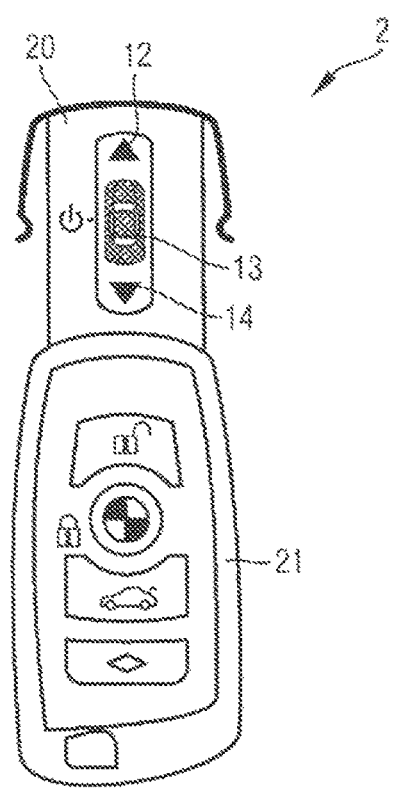

In the case in FIG. 7, the forward button 12 is actuated to initiate the parking procedure in the forwards direction (to initiate the unparking procedure in the reverse direction, the reverse button 14 is actuated); in this case, a long press (meaning longer than 2 s) is sufficient, for example. FIG. 8 shows the remote control upon the actuation of the forward button 12, wherein the forward button 12 and the activation button 13 are illuminated in green. During the forwards movement, the forward button 12 must be continuously actuated, because otherwise it springs back automatically into the non-pressed position. As soon as the button 12 (or the button 14 in the case of movement in the reverse direction) of the remote control 2 is no longer actuated, the parking assistant 5 brakes the vehicle 1 and brings it to a halt using the service brake. The remote control 2 enables the operator 3 to brake the vehicle 1 in an emergency by letting go of the button 12 (or the button 14 in the case of movement in the reverse direction) of the remote control 2. If the forward button 12 becomes jammed in the pressed position, the vehicle is preferably brought to a halt by means of a pressing of any other button of the remote control 2, using the service brake.

The vehicle is likewise halted by means of the service brake if the detector device 8 detects an obstacle on the basis of the sensor information of the sensor 6a.

The parking procedure can be re-assumed from the parked state by once again actuating the forward button 12. The parking procedure is then continued. The driver preferably always has the possibility of carrying out a quick change of the direction of movement. For this purpose, a clear direction of movement is assigned to the buttons 12 and 14 of the remote control 2. In order to carry out the change in the direction of movement as quickly as possible, the vehicle 1 is initially held by the service brake for a maximum of 10 s, by way of example, following a halting of the vehicle. If no other actuation of the remote control 2 by the driver occurs during this time, the vehicle 1 switches to the secure vehicle state (gear position P). The parking function can be ended when the vehicle has assumed the secure vehicle state and the parking procedure is not resumed within 30 seconds.

The vehicle comes to a halt by means of the service brake, and switches into the secure vehicle state (gear position P) if the vehicle has reached the end position in the parking space. The end position is reached, by way of example, when either the detector 8 detects a large-surface area object in the direction of travel (case 1, when a frontal boundary object exists), or the detector 8 detects that the front of the vehicle 1 is projecting past the lateral boundary object (case 2, when there is no frontal boundary object). However, the vehicle always only travels a maximum, specific distance, for example a maximum of 1.2 times the length of the vehicle. Then the gear position P is selected, the vehicle is no longer ready for movement, and the ignition is switched off.

The unparking procedure is controlled in a similar manner. After the parking function operating part is moved out, and the activation button 13 is activated, the parking function is ready for the unparking procedure.

So that the vehicle at this point moves out of the parking space backwards, the driver must actuate and hold down the reverse button 14 of the remote control 2. As soon as the reverse button 14 of the remote control 2 is no longer actuated, the function halts the vehicle 1 using the service brake.

The unparking procedure can be resumed from the halt by the reverse button 14 being actuated and held down again.

Once the end position is reached, the vehicle 1 is halted by means of the service brake, and switches over to the secure state (gear position P). The end position is, by way of example, the starting point of the parking procedure if a parking procedure has previously been carried out by the function, and the vehicle 1 has not been moved in the meantime. The end of the function can be signaled to the driver, by way of example, by the outer mirror tilting outward. The vehicle is then, at this point, ready for movement, and in gear position P. The readiness for movement can also be ended if the driver does not open a door within 30 seconds.

The duty of the driver to control a parking or unparking procedure can be ensured in a configuration wherein the driver assistance system 5 continuously monitors the remote control 2 to see whether the same is positioned in a defined range near the vehicle 1—for example within a lateral and rearward region of the vehicle at a maximum of 2 m or 4 m away.

If the remote control 2 is located outside of the range, the assistant system 5 automatically halts the vehicle 1 in a parked position, for example by means of the service brake. The vehicle 1 can switch over to a secure vehicle state with the gear position P if no other button is pressed within a certain duration of time (for example 10 s).

For this purpose, two different radio modes are included in the communication device 10 of the vehicle 1: a first LF radio mode (for example operating at 125 kHz) with a lesser range, and a second UHF radio mode (for example operating at 433 MHz) with a greater range. The first radio mode has a range of 2 meters or 4 meters, by way of example. The second radio mode has a range of tens of meters, by way of example.

The communication device 10 transmits a coded query signal to the remote control 2 repeatedly, in the LF radio mode with the lesser range. If the remote control 2 is located in the range of the first radio mode, the remote control 2 transmits a confirmation signal to the vehicle 1 confirming that it has received the query signal of the vehicle 1. The confirmation signal is received in the UHF radio mode in the communication device 10 of the vehicle 1. If the confirmation signal is not received, this means that the remote control 2 is located outside of the range of the LF radio mode, and the parking function cannot be activated or is blocked or interrupted. If the remote control 2 is outside of the allowed range around the vehicle 1, this is signaled to the operator 3 preferably via the remote control 2, particularly in a visual manner. For this purpose, corresponding data is transmitted by the vehicle 1 to the remote control 2. According to FIG.

9, the activation button 13 is illuminated in yellow if the remote control 2 is located outside of the allowed range around the vehicle.

The vehicle 1 preferably transmits the control information for the individual display elements of the parking function buttons 12-14 directly to the remote control 2, concerning whether and in what color each parking function button 12-14 should be illuminated, and whether the illumination should be a blinking or continuous illumination (illumination mode). In steps 260-290 and 330-360, the control information on the color and the illumination mode for the buttons 12 and 14 is obstacle detection information on the presence of an obstacle in the forwards direction and/or reverse direction, because the color control information and the illuminated mode control information (even in and of themselves) indicate whether an obstacle is present or not in the respective direction.

Figure 10:
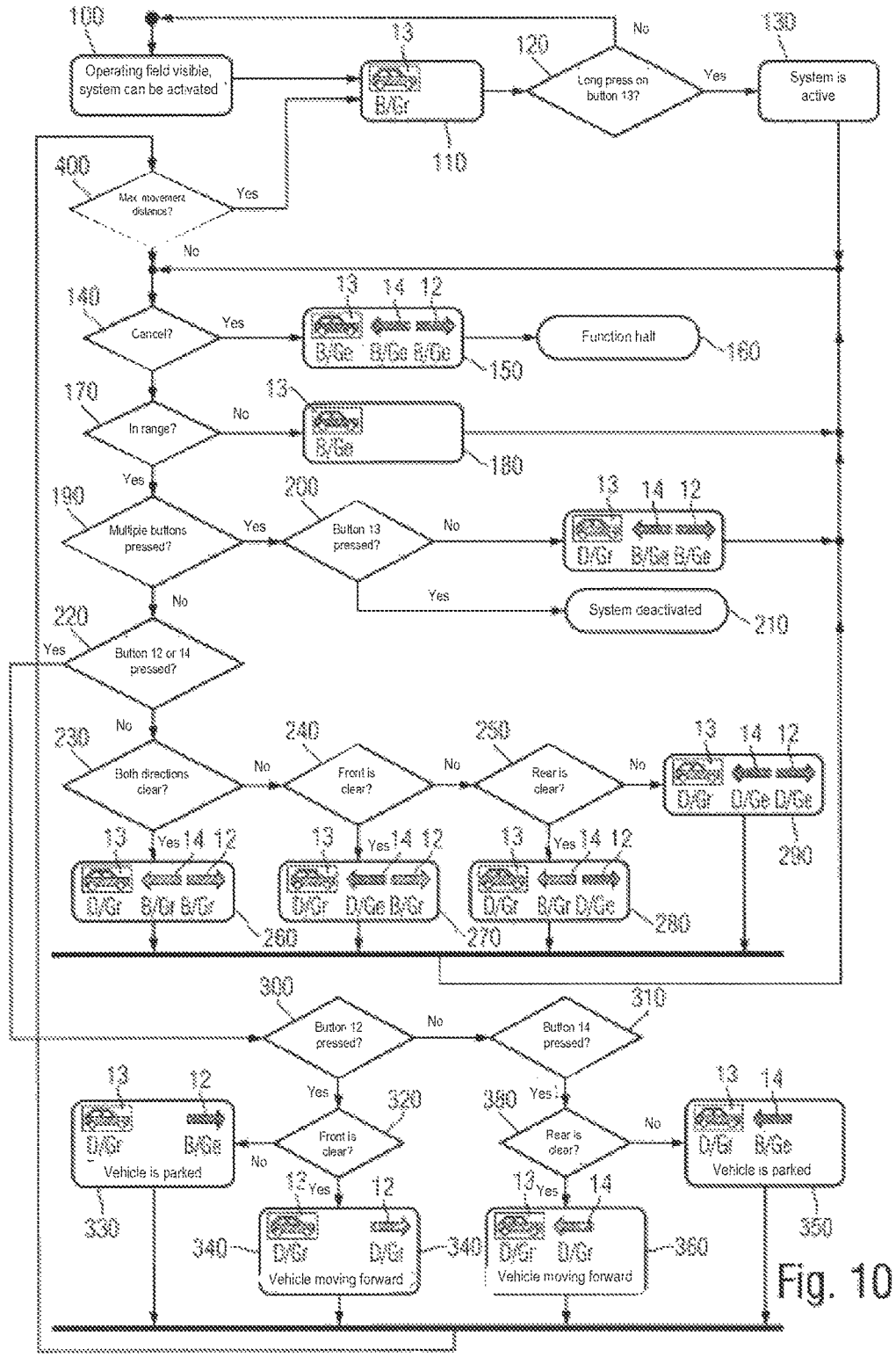
FIG. 10 shows an exemplary process diagram for the operation of the parking assistance system.

FIG. 10 shows an exemplary process diagram for the operation of the parking assistance system 5. Prior to a parking procedure, the driver 3 exits the vehicle 1, the same being positioned in front of the parking space 4, oriented toward the same, and in the gear position P of the automatic transmission. The driver 3 moves the parking operating part 20 out of the base element 21 of the remote control 2, such that the parking operating surface is visible. The parking assistance system 5 can be activated at this point (see step 100). This is indicated to the driver 3 by a green, blinking activation button 13, wherein the driver 3 is requested to actuate the activation button 13 by the blinking (see step 110). In FIG. 10, a blinking button is indicated by the letter "B" (for blinking), and a non-blinking, illuminated button is indicated by the letter "D" (for duration). A green illuminated button is indicated by the characters "Gr", and a yellow illuminated button is indicated by the characters "Ge". The parking assistance system 5 is activated by a long pressing (for example greater than 2 s) of the button 13 (see query 120 and step 130). The function is initialized at this point, and ready for the parking procedure. In addition, the front headlight can optionally be switched on. The state of readiness can additionally be indicated to the driver 3 via the tilting of the outer mirror.

A check can optionally be made of whether the activation is carried out within a certain period of time (for example in less than 5 s) after the exiting of the vehicle 1. The activation procedure, by completely moving the operating part 20 out, and then pressing the activation button 13 for a long time, should prevent an unintentional activation.

By means of the request 140, it is possible to check whether the driver 3 would like to cancel the parking function by actuating the button 13. The functional cancellation is indicated to the driver 3 by yellow blinking buttons 12-14 (see steps 150 and 160).

A check is made by means of the query 170 as to whether the driver 3 is positioned in the allowed range near to the vehicle. This can be checked on the basis of whether the confirmation signal has been received from the remote control 2 in the UHF range. If the remote control 2 is outside of the range, this is indicated to the driver 3 by a yellow, continuous illumination of the activation button 13 (see step 180). In the query 190, a check is made as to whether multiple buttons 12-14 have been pressed. If the button 13 is pressed in this case (see query 200), the system is deactivated (see step 210). In query 220, a check is made as to whether the forward button 12 or the reverse button 14 can been actuated. If this is not the case, then a check is made of whether both the forwards direction and the reverse direction are clear (see query 230), only the forwards direction is clear (see query 240), or only the reverse direction is clear (see query 250). The absence of an obstacle in the forwards direction is indicated to the driver 3 by a green blinking forward button 12 (see steps 260 and 270), an obstacle in the forwards direction is indicated to the driver 3 by a continuously yellow illuminated button 12 (see steps 280 and 290). An absence of an obstacle in the reverse direction is indicated to the driver 3 by a green blinking reverse button 14 (see steps 260 and 280), an obstacle in the reverse direction is indicated to the driver 3 by a continuously green illuminated button 14 (see steps 270 and 290). If the result of the query 220 is that one of the buttons 12 or 14 is pressed, a check is made in the queries 300 and 310 as to whether the button 12 or the button 14 is actuated.

If the forward button 12 is actuated, a check is made in query 320 to determine that no obstacle is positioned in the forwards direction. If an obstacle is present in the forwards direction, this is indicated to the driver 3 by a yellow blinking forward button 12, wherein the vehicle 1 is parked or is halted if it is already moving (see step 330). A user action is communicated by a blinking: in this case, the yellow blinking of the forward button 12 requests the user to release the button 12.

If there is no obstacle in the forwards direction, the vehicle 1 begins to move in the forwards direction, or continues to move in the forwards direction if it is already moving (see step 340). This indicated to the driver 3 by a continuously green-illuminated forward button 12. If there is no obstacle in the reverse direction (see query 380), this is indicated to the driver 3 by a yellow blinking reverse button 14, wherein the vehicle is parked or is halted if it is already moving (see step 350). The driver is requested to let go of the button by the yellow blinking. If there is no obstacle in the reverse direction, the vehicle 1 begins to move in the reverse direction—for example in an unparking procedure—or continues to move in the reverse direction if it is already moving (see step 360). This is indicated to the driver 3 by a continuously green-illuminated reverse button 14. After one of the steps 330-360 is selected, the method jumps to query 400, wherein a check is made as to whether the vehicle 1 has already exceeded a maximum allowing movement distance during the parking procedure. This corresponds to 1.2 times the length of the vehicle, by way of example.

A remote control concept for a parking assistant has been described above, wherein the parking function operating surface has—additionally to the parking function operating buttons—a set of display symbols (in this case in the form of LEDs which backlight the operating buttons), said display symbols symbolizing the state of the parking function and the assignment of the buttons to actions. In order to not depict all display possibilities inside the vehicle on the remote control, the parking function has a logic which independently analyzes certain display possibilities, and initiates actions without an interaction with the user.

The duty of the driver to control the situation can be ensured in a configuration wherein the parking function continuously monitors the remote control to see whether the same is positioned in a defined range near the vehicle. If the remote control is located outside of the range, the assistant system automatically halts the vehicle in a parked position, for example by means of the service brake. For the monitoring function, a radio system having an LF and a UHF mode is used, as described above. As a result, the configuration prevents the driver from being able to remove himself from the parking situation and no longer see the area which the vehicle is driving into.

The keys are designed in such a manner that they cannot be arrested in the pressed position, and must be continuously held down by hand in this position, wherein otherwise they automatically spring back to the unpressed position. As soon as the corresponding button of the remote control is no longer actuated, the parking function halts the vehicle with the service brake. In this way, a continuous contact is created between the driver and the vehicle, wherein it is possible for the driver to halt the vehicle in an emergency by releasing the button of the remote control. Likewise, a button is functionally assigned to each direction of travel—meaning forwards and reverse. As such, multi-point parking behavior can be possible, wherein the operator of the remote control can always specify the change of the direction of movement himself, and therefore can control the parking process.

The vehicle key is preferably designed in such a manner that the parking operating part must be moved out, and thereby the parking function operating elements are visible. In addition, a press (particularly a long press) of an activation button for the activation of the parking function, or alternatively even a determined sequence of button actuations for turning on the parking function, can also be required. It could also be contemplated that multiple buttons must be pressed at the same time in order to switch on the parking function. Such measures prevent the parking function from being initiated unintentionally (for example from a pocket) or by children.

The vehicle is preferably always automatically brought to a halt as soon as either the remote control leaves the allowed range, or any other operating element on the remote control is actuated. In this way, dangerous situations are avoided in which the vehicle can no longer be brought to a halt if the respective parking function button on the remote control becomes jammed in the pressed state.

The preferably clear assignment of the button of the remote control to one direction of travel serves the purpose of allowing the driver to immediately react to a dangerous situation he has identified, among other things, with a change in the direction of travel, and to remove the vehicle from this situation. In this way, the driver has the same option for intervention as in the vehicle. Therefore, there is preferably a button to which the forward movement of the vehicle is assigned, and preferably a button to which the reverse movement of the vehicle is assigned. In addition, by means of an LED (or alternatively a display), the assignment is displayed to the operator, by way of example. In addition, the vehicle is first brought to a halt by means of the service brake upon each release of the respective parking function button. Only after a defined period of time (for example 10 s), the parking block is preferably activated in order to hold the vehicle parked for a longer duration. In this way, it is possible to carry out a change in the direction of travel as quickly as possible (halting the vehicle with the service brake), and also to fully and permanently secure the vehicle against rolling away (parking block).

In addition, the distance of the vehicle can be measured via sensors inside the vehicle. As soon as a defined distance in the forwards direction or the reverse direction has been reached or exceeded, the vehicle is preferably automatically halted by braking without user interaction. In this way, the action radius of the vehicle is limited in order to minimize the potential risk.

The vehicle can optionally be depicted to the user on a display of the remote control or a smartphone as a true image, or a symbolic depiction.

Figure 11:
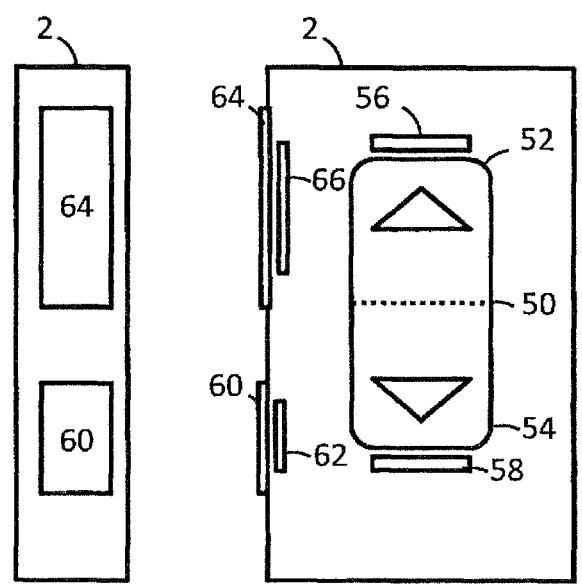
FIGS. 11-12 show further embodiments for a remote control according to the invention.

A further embodiment of a remote control 2 according to the invention is illustrated in FIG. 11 (at right in top view; at left in side view). Instead of using two separate buttons for the forwards movement and the reverse movement, a combined forwards and reverse operating element can be used, in the form of a rocker button 50, wherein upon the actuation (by pressing it down) of the upper half 52 of the rocker button 50, a forwards movement is carried out, or upon the actuation (by pressing it down) of the lower half 54 of the rocker button 50, a reverse movement is carried out, as long as each half 52 and/or 54 of the rocker button is actuated. If the actuation of one half 52 and/or 54 of the rocker button 50 is ended, the rocker button 50 springs back into the starting position.

In addition, there is a forward display element 56, and a reverse display element 58, wherein the forwards display element 56 is arranged above next to the rocker button 50, while the reverse display element 58 is arranged below next to the reverse button 50. The display elements 56 and 58 can each have one or more LEDS, by way of example, and preferably be illuminated in different colors. For the purpose of signaling the presence of an obstacle in the forwards or reverse direction, the forwards display element 56 is illuminated, and/or the reverse display element 58 is illuminated, for example in red, while the respective display element 56 and 58 is illuminated in green, for example, to signal the absence of an obstacle in the respective direction. In addition, an on/off switch 60 for generally switching on and off the parking function, with a status display element 62 positioned next to the same, and a deadman button 64, with a deadman display element 66 positioned next to the same, are included. All display elements 56, 58, 62, and 64 can preferably be illuminated in yellow, red, and green. In order to request the user to actuate an operating element 52, 54, 60, 64, the assigned display element 56, 58, 62, 66 can further be switched over to a blinking state.

One exemplary process is explained below. After actuation of the on/off button 60, the status display element 62 is illuminated continuously in green, and the deadman display element 66 blinks in yellow. The blinking serves as a request for actuation. Upon continuous actuation of the deadman button 64, and with no obstacle in the forwards and reverse directions, the forwards display element 56 and the reverse display element 58 blink in green in order to request the user to actuate the upper side 52 or the lower side 54 of the rocker button 50. The display elements 62 and 66 are illuminated continuously in green. Upon the actuation of the upper side 52 of the rocker button 50 (and the further, continuous actuation of the deadman button 64), travel begins in the forwards direction. The forwards display element 56 is continuously illuminated in green, and the reverse display element 58 is not illuminated. If there is an obstacle in the forwards direction, or the end position has been reached, the forwards display element 56 is illuminated in red.

Figure 12:
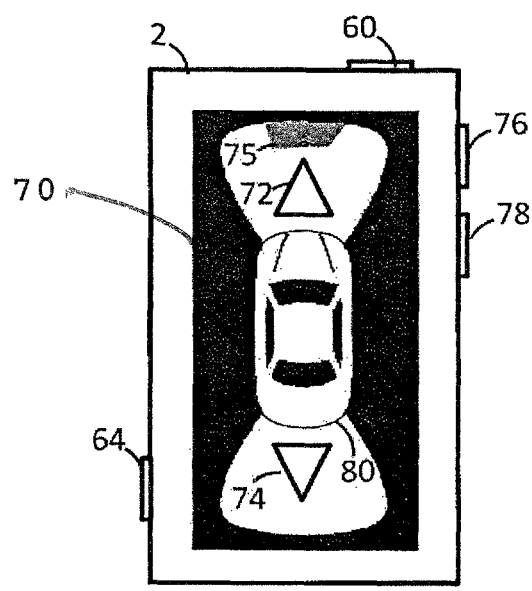

A further embodiment of a remote control 2 according to the invention is illustrated in FIG. 12. This includes a display screen 70 (for example a liquid crystal display (LCD) or an organic light emitting display (OLED)) for the purpose of displaying the presence of an obstacle. The display logic corresponds substantially to the first embodiment in FIG. 2 to FIG. 10, by way of example. If no obstacle is present in the forwards direction, a green symbol 72 (in this case, a triangle) appears, by way of example, on the screen 70. If there is an obstacle in the forwards direction, a red symbol 72 (in this case a triangle) appears on the display 70, by way of example. If there is no obstacle present in the reverse direction, a green symbol 74 (in this case a triangle) appears on the display 70 by way of example. If there is an obstacle in the reverse direction, a red symbol 74 (in this case a triangle) appears on the display screen 70. As an alternative or in addition thereto, the distance to the obstacle could be illustrated graphically on the display screen 70. For this purpose the boundary of a detected obstacle, and the space behind the boundary of the obstacle, could be emphasized in color with respect to the clear space in the illustrated environment detection area, as is indicated in FIG. 12 (see the surface 75 in the environment detection area in the forwards direction, wherein the surface 75 represents the boundary of the obstacle and the space behind the boundary of the obstacle).

Status information for the parking function can be displayed via the vehicle 80 illustrated on the display screen 70.

The operation of the parking function is carried out via mechanical buttons in FIG. 12. For this purpose, there is a forward button 76, a reverse button 78 (wherein the buttons 76 and 78 can be implemented as a common rocker button), an on/off button 60, and a deadman button 64.

A notification (for example a blinking arrow) can optionally be displayed on the display screen 70 next to the respective button 60, 64, 76, and 78, as an actuation notification, when the respective button 60, 64, 76, and 78 should be actuated.

If the display screen 70 is a touchscreen, the operation of the parking function can also take place via the touchscreen 70. By way of example, the vehicle 80 illustrated on the touchscreen 70 can be moved upward or downward like a slider, by a finger movement. The forwards movement is initiated by the sliding of the vehicle 80 upward; the sliding of the vehicle 80 downward initiates the reverse movement, as long as the deadman button 64 is actuated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A remote control device, comprising:
   one or more parking function operating elements that control a parking assistance system of a passenger motor vehicle to park and/or un-park the passenger motor vehicle;
   a bidirectional wireless communication device that wirelessly communicates with the parking assistance system;
      wherein, the bidirectional wireless communication device has a first radio mode and a second radio mode having a greater range than a range of the first radio mode,
      wherein, in the first radio mode, the bidirectional wireless communication device is configured to receive an emitted signal emitted by the passenger motor vehicle when the remote control device is located within the range of the first radio mode, and
      wherein, in the second radio mode, the bidirectional wireless communication device is configured to transmit a confirmation signal in response to receiving the emitted signal from the passenger motor vehicle, and
   a display element that perceptively signifies, in response to receiving a signal from the passenger motor vehicle indicating that the confirmation signal had not been received, that the bidirectional wireless communication device is outside of an allowed range of the passenger motor vehicle and that the parking assistance system cannot be activated.

2. The remote control according to claim 1, wherein the display element includes at least one of:
   a forwards display element configured to visually signal, in a predefined illumination, the presence of an obstacle in a forward direction, and
   a reverse display element configured to visually signal, in the predefined illumination, the presence of an obstacle in a reverse direction.

3. The remote control according to claim 2, wherein the one or more parking function operating elements include:
   a forwards operating element configured to control a forward movement of the passenger motor vehicle,
   a reverse operating element configured to control a reverse movement of the passenger motor vehicle, and
   a combined forwards and reverse operating element configured to control the forward and reverse movement of the passenger motor vehicle.

4. The remote control according to claim 3, wherein at least one of:
   the forwards display element is arranged next to the forwards operating element,
   the reverse display element is arranged next to the reverse operating element, and
   at least one of the forwards display element and the reverse display element is arranged next to the combined forwards and reverse operating element.

5. The remote control according to claim 3, wherein the display element that is functionally assigned to at least one of the forwards operating element, the reverse operating element, and the combined forwards and reverse operating element,
   wherein at least one of: the forwards operating element, the reverse operating element, and the display element, forms one integrated operating and display element.

6. The remote control according to claim 5, wherein the operating element in the integrated operating and display element is backlit with light from the display element.

7. The remote control according to claim 6, wherein the integrated operating and display element has a button which is backlit by a light emitting diode (LED) which is functionally assigned to the button.

8. The remote control according to claim 2, wherein at least one of the forwards display element and the reverse display element:
   is illuminated, in accordance with the predefined illumination, in a first color for signaling the presence of the obstacle in one of the forward direction or the reverse direction, and
   is illuminated, in accordance with the predefined illumination, in a second color for signaling the absence of the obstacle in another one of the forward direction or the reverse direction.

9. The remote control according to claim 1, wherein the one or more parking function operating elements have an activation operating element for activating the parking assistance system.

10. The remote control according to claim 9, wherein the display element signals a status of a parking function and is functionally assigned to the activation operating element.

11. The remote control according to claim 1, wherein the display element blinks to request actuation of an associated operating element or to request release of the associated operating element.

12. The remote control according to claim 1, further comprising:
a base element, and
a parking function operating part comprising the one or more parking function operating elements,
wherein, when the parking function operating part is in a covered state, the one or more parking function operating elements of the parking function operating part are covered and cannot be operated,
wherein the parking function operating part is transitioned from the covered state into an open state of the parking function operating part by moving the parking function operating part with respect to the base element, and
wherein the one or more parking function operating elements are visible and operable when in the open state.

13. The remote control according to claim 12, wherein the parking function operating part is transitioned from the covered state into the opened state by sliding out, pulling out, or flipping out the parking function operating part.

14. The remote control according to claim 1, wherein the remote control and the parking assistance system are cooperatively configured to effectuate an automated parking of the passenger motor vehicle with respect to a head-in parking space.

15. The remote control according to claim 1, further comprising a touchscreen for implementing the one or more parking function operating elements and the display element.

16. The remote control according to claim 1, wherein the display element is a display screen.

17. A radio control vehicle key, comprising:
a base element; and
a parking function operating part comprising one or more parking function operating elements for controlling at least one of parking or un-parking of a passenger motor vehicle; and
a wireless transceiver that receives obstacle detection information,
wherein, the wireless transceiver has a first radio mode and a second radio mode having a greater range than a range of the first radio mode,
wherein, in the first radio mode, the wireless transceiver is configured to receive an emitted signal emitted by the passenger motor vehicle when the radio control vehicle key is located within the range of the first radio mode, and
wherein, in the second radio mode, the wireless transceiver is configured to transmit a confirmation signal in response to receiving the emitted signal from the passenger motor vehicle, and
when the parking function operating part is in a covered state, the one or more parking function operating elements of the parking function operating part are covered and cannot be operated, and
the parking function operating part is transitioned from the covered state into an open state of the parking function operating part by moving the parking function operating part with respect to the base element, wherein the parking function operating elements are visible and operated when in the open state
a display element that perceptively signifies, in response to receiving a signal from the passenger motor vehicle indicating that the confirmation signal had not been received, that the wireless transceiver is outside of an allowed range of the passenger motor vehicle and that the parking assistance system cannot be activated.

18. The radio control vehicle key according to claim 17, wherein the parking function operating part is transitioned from the covered state into the opened state by sliding out, pulling out, or flipping out the parking function operating part.

19. The radio control vehicle key according to claim 17, wherein the display element is a display screen.

* * * * *